July 3, 1956  J. W. MOYER ET AL  2,753,462
NEUTRON FLUX MEASURING DEVICE
Filed Oct. 5, 1953

INVENTORS
James W. Moyer
Henry Hurwitz
BY

United States Patent Office 2,753,462
Patented July 3, 1956

2,753,462

NEUTRON FLUX MEASURING DEVICE

James W. Moyer and Henry Hurwitz, Jr., Schenectady, N. Y., assignors to the United States of America as represented by the United States Atomic Energy Commission Application October 5, 1953, Serial No. 384,362

9 Claims. (Cl. 250—83.1)

The present invention relates to measuring means, and more particularly to a device for measuring neutron flux which may be inserted into a chain reacting assembly, such as disclosed in the patent to Fermi et al. No. 2,708,656, issued May 17, 1955.

For some time there has existed need for a neutron flux measuring device of relatively simple construction and operation which could be of very small size and any desired shape, and particularly for such a device which could be utilized to measure low neutron fluxes without serious noise problems. The present invention aims to achieve these and other desiderata by providing a direct current device which does not involve complicated high-frequency low-loss cables, bulky preamplifiers, counting equipment, complicated pulse measurements, ionization chambers, etc.

An object of the present invention is to provide a new and improved neutron flux measuring device.

Another object of the invention is to provide an improved neutron flux measuring device which may be of very small size.

Another object of the invention is to provide a neutron flux measuring device of high sensitivity.

A further object of the invention is to provide a neutron flux measuring device of relatively simple construction and operation.

A still further object of the invention is to provide a neutron flux measuring device which is particularly useful in measuring low fluxes and which may be utilized in low flux regions of high flux reactors or piles.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
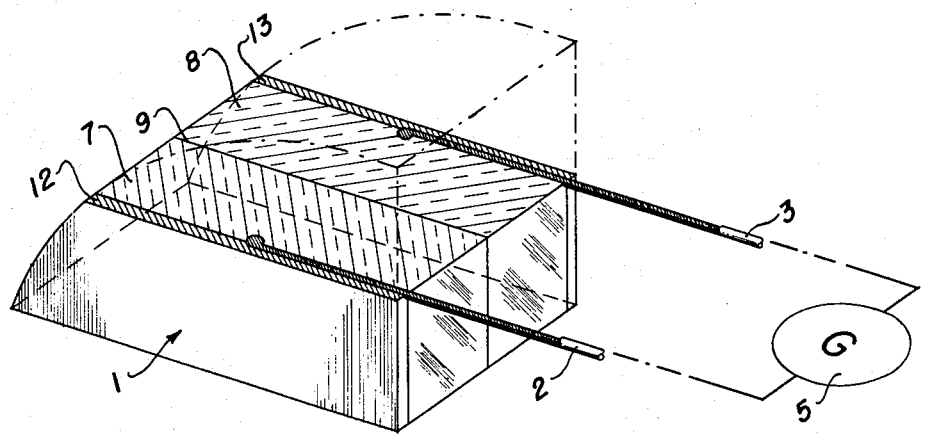
Figure 2:
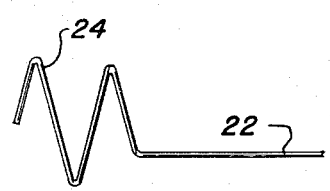

In the accompanying drawings,

Fig. 1 is an enlarged perspective and sectionalized view showing one form of the invention; and Fig. 2 is a view showing a modified form of electrode configuration.

Described generally, the neutron flux measuring device of the present invention comprises a broad area P-N junction unit, of material such as germanium or silicon, with outwardly disposed surfaces of the P and N regions covered by a layer of alpha-particle-yielding material such as boron or lithium, and having conductors or electrodes connected with the P and N regions for connection with some suitable remotely located indicating instrument such as a galvanometer. When the illustrated device is disposed in neutron flux, a current is generated which may be read on the instrument dial.

As shown in Fig. 1 of the accompanying drawings, the device comprises a composite member 1 of any suitable size and shape adapted for positioning in a neutron flux region of a reactor, and from which extend conductors 2 and 3 for connection with an indicating instrument such as a galvanometer 5. The galvanometer 5 should be of appropriate sensitivity for the particular flux to be measured, but preferably will not have a resistance greater than that of the P-N junction at zero current and voltage.

The member 1 is shown comprised of an N type region 7 and a P type region 8 forming an intermediate P-N junction 9, with outwardly disposed P and N surfaces each covered by a layer 12, 13 of alpha-particle-yielding material and with portions of the conductors or electrodes 2 and 3 connected with the respective regions 7 and 8. As is generally understood in the art, a P type region has "positive" characteristics and an N type region has "negative" characteristics.

The conductors attached to the P and N regions 7 and 8 should extend over only a small portion of the area on the side covered by the layer or layers 12, 13, in order that when disposed in a neutron flux alpha particles yielded by the layers (along with lithium 7 recoil nuclei) will not be absorbed by the electrode material but may enter the material comprising the P and N regions and create electron pairs or charges that may be collected in a circuit which includes the conductors, resulting current being readable on the galvanometer 5.

The material comprising the P and N type regions may be germanium, silicon, or any semi-conducting crystal or composition in or on which a P-N junction may be formed, or it may be a combination of crystals. Either grown P-N junctions or those made by other methods may be used. Silicon junctions are in general of higher impedance and yield larger currents than germanium.

The layer or layers 12, 13 for yielding alpha particles in a neutron flux may be boron$^{10}$, natural boron, a boron compound, or a boron impregnation, and the lithium may be in a separated or natural state, a lithium compound or a lithium impregnation; or, if desired, any suitable combination of such boron and lithium materials may be utilized.

The sensitivity of the device when employing boron$^{10}$ is enhanced as compared to natural boron, as the cross section for boron$^{10}$ is over five times that of the natural mixture. The same is true where the isotope lithium$^6$ is utilized in lieu of natural lithium, the cross section for lithium$^6$ being about fourteen times that of the natural mixture.

Boron materials are preferably employed for the layers 12, 13 when the dependence of the cross section according to the reciprocal of the neutron velocity is desired. In applications where a less accurate reciprocal of the neutron velocity ($1/v$) cross section is adequate, alpha particles and tritons from the fission of lithium materials may be used.

In view of the large cross section for boron a thin layer, of no greater thickness than the range of the alpha particles, is adequate; layers of this thickness do not objectionably disturb the flux distribution.

One example of dimensions which may be employed for the present measuring device is a grown germanium junction having one area of about 0.35 square centimeter and a thickness of about 0.2 centimeter, coated on both sides with boron$^{10}$ layers of thickness about 0.1 to 0.2 micron. The conductors connected with the crystal may be attached to a galvanometer of about 21 ohms' resistance.

These dimensions are given merely by way of example as a crystal about 0.1 cm. by 0.1 cm. by 0.05 cm. thick can also be employed. In measurement of neutron flux in a low flux critical assembly for danger coefficient or cross section studies, it is important that a detector of negligible size and poison effect be used; the present device lends itself nicely to this.

Where neutron fluxes to be measured are quite small, e. g., less than $10^6$ neutrons per square centimeter seconds, boron may be used on both the P and N sides, as shown. Where germanium is used in the P-type and N-type regions, incident alpha particles cause gradual surface conversion of N-type material to P-type, and it is preferable that the active material be used on the P-type side only.

In some instances, particularly with P-N junction units which have a junction 9 very close to outer surfaces of the P or N regions, it may be desirable to attach grid type electrodes to one or both of the P and N-type regions in order to insure collection of the charges released by alpha particles prior to recombination of the charges. Fig. 2 shows an electrode of this type having a grid portion 24 adapted to extend over and connect with the P or N regions in lieu of the conductors 2, 3, and a portion 22 extending from the grid 24 for connection with a remotely located indicating instrument.

Where a P-N junction unit of germanium is employed, the device may be used for several hours at lower fluxes of $10^5$ to $10^6$. With fluxes higher than $10^7$ to $10^8$, the life of the device is shorter, due to deterioration of the N-material.

While only a single device is shown in the accompanying drawings, it will be clear that a plurality of them may be coupled together in some conventional series, parallel, series-parallel, or other hook-up.

It will be seen that the present device may be of extremely small size and any desired shape; only direct current is involved and hence there are no complicated pulse measurements, counting equipment, bulky preamplifiers, high-frequency low-loss cables, etc. Low neutron fluxes can be measured without serious noise problems. While the invention is useful primarily in measuring low neutron fluxes, it may be employed in low flux regions of high flux reactors. Where boron is utilized for the covering layers, the device has an accurate sensitivity with respect to the reciprocal of the neutron velocity.

As various changes may be made in the form, construction and arrangement of the parts herein without sacrificing any of its advantages it is to be understood that all matter herein is to be interpreted as illustrative and not in a limiting sense.

We claim:

1. A neutron flux measuring device comprising means including P- and N-type regions with an intermediate P-N junction, a layer of material for yielding alpha particles under neutron bombardment overlying an outwardly disposed surface of said P-type region at a location spaced from said P-N junction, and separate conductors directly connected with said N-type and P-type regions at locations spaced from said intermediate P-N junction for connection with an indicating instrument.

2. A device as claimed in claim 1, in which at least one of the conductors has a portion of gridlike configuration disposed along one of said regions.

3. A neutron flux measuring device comprising means including P- and N-type regions with an intermediate P-N junction, layers of material for yielding alpha particles under neutron bombardment overlying outwardly disposed disposed surfaces of said P- and N-type regions respectively at locations spaced from said P-N junction, and separate conductors directly connected with said N-type and P-type regions for connection with an indicating instrument.

4. A neutron flux measuring device comprising means including P- and N-type regions with an intermediate P-N junction, a layer including material selected from the group consisting of boron and lithium overlying an outwardly disposed surface of said P-type region at a location spaced from said P-N junction, and separate conductors directly connected with said N-type and P-type regions for connection with an indicating instrument.

5. A neutron flux measuring device comprising means including P- and N-type regions with an intermediate P-N junction, a layer of boron overlying an outwardly disposed surface of said P-type region at a location spaced from said P-N junction, and conductors directly connected with said N-type and P-type regions adapted to be attached an indicating instrument.

6. A device as claim 5, in which a layer of boron also overlies an outwardly disposed surface of said N-type region at a location spaced from the P-N junction.

7. A device as claimed in claim 5, in which said means comprises germanium having said regions and junction.

8. A device as claimed in claim 5, in which said means comprises silicon having said regions and junction.

9. A neutron flux measuring device comprising means including P- and N-type regions with an intermediate P-N junction, a layer of lithium overlying at least an outwardly disposed surface of said P-type region at a location spaced from said P-N junction, and conductors directly connected with said N-type and P-type regions adapted to be attached to an indicating instrument.

References Cited in the file of this patent

UNITED STATES PATENTS

| | | |
|---|---|---|
| 2,440,167 | Broxon et al. | Apr. 27, 1948 |
| 2,564,626 | MacMahon et al. | Aug. 14, 1951 |
| 2,608,661 | Zinn | Aug. 26, 1952 |
| 2,629,800 | Pearson | Feb. 24, 1953 |
| 2,650,311 | Bray et al. | Aug. 25, 1953 |
| 2,677,772 | Moon | May 4, 1954 |